Figure 1:
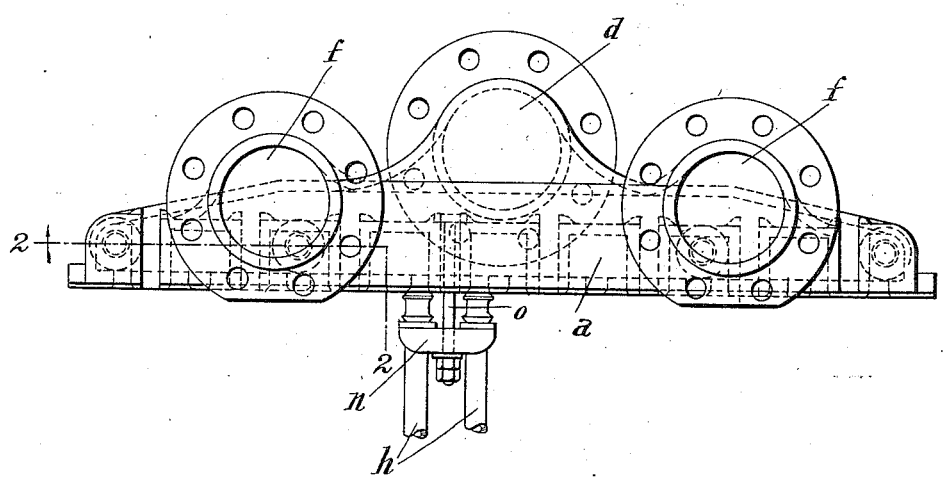

N. T. McKEE.
STEAM COLLECTOR FOR SUPERHEATERS.
APPLICATION FILED DEC. 13, 1913.

1,124,493.

Patented Jan. 12, 1915.

2 SHEETS—SHEET 1.

WITNESSES
George De Boy
Elmer S...young

INVENTOR
NEAL TRIMBLE McKEE
BY
Bierents Knauth
ATTORNEYS

N. T. McKEE.
STEAM COLLECTOR FOR SUPERHEATERS.
APPLICATION FILED DEC. 13, 1913.
1,124,493.
Patented Jan. 12, 1915.
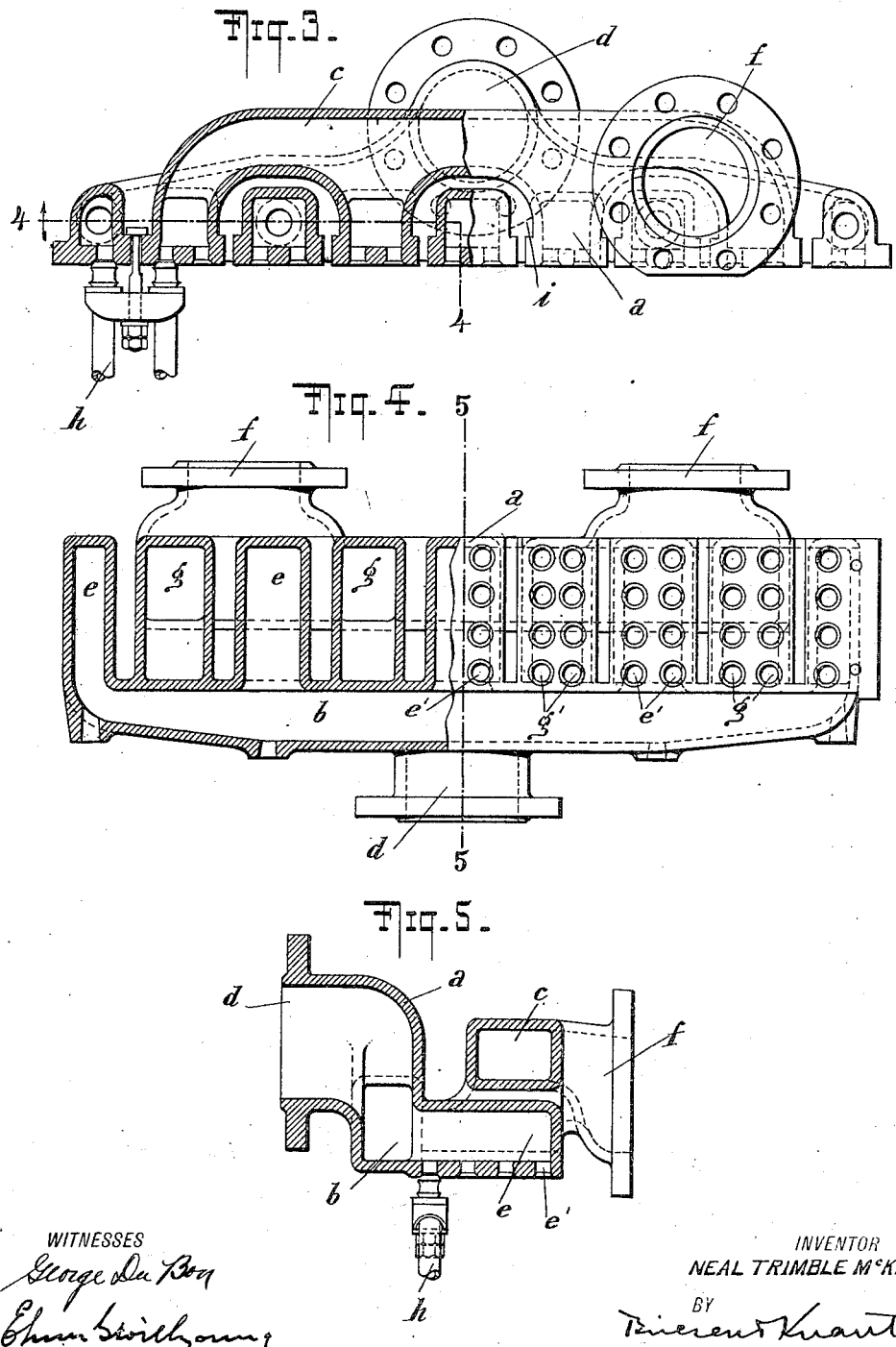

UNITED STATES PATENT OFFICE.

NEAL TRIMBLE McKEE, OF DOBBS FERRY, NEW YORK, ASSIGNOR TO LOCOMOTIVE SUPERHEATER COMPANY, OF NEW YORK, N. Y., A CORPORATION OF DELAWARE.

STEAM-COLLECTOR FOR SUPERHEATERS.

1,124,493.   Specification of Letters Patent.   Patented Jan. 12, 1915.

Application filed December 13, 1913. Serial No. 306,404.

*To all whom it may concern:*

Be it known that I, NEAL TRIMBLE McKEE, a citizen of the United States, and resident of Dobbs Ferry, Westchester county, New York, have invented a new and useful Improvement in Steam-Collectors for Superheaters, of which the following is a specification.

My invention relates to steam collectors for superheaters and particularly to steam collectors for use with locomotive superheaters of the type comprising superheating tubes or loops arranged in boiler flues (fire tubes), and has for its object to provide a steam collector embodying peculiar advantages as to convenient and economical construction, assembly in the locomotive, compactness, freedom from deleterious strains due to temperature differences between the parts carrying saturated and superheated steam respectively, and freedom from heat losses between said same parts.

More specifically it is the object of my invention to provide a construction of steam collector for superheaters somewhat similar to the two forms shown in a certain patent, granted March 4, 1913, Number 1,054,676, on the application of Francis J. Cole and Simon Hoffmann, but having certain advantageous features not possessed by either of the forms of the patent referred to, while at the same time being free from certain disadvantages pertaining to both of said forms.

The invention will be better understood by referring to the drawings in which—

Figure 2:
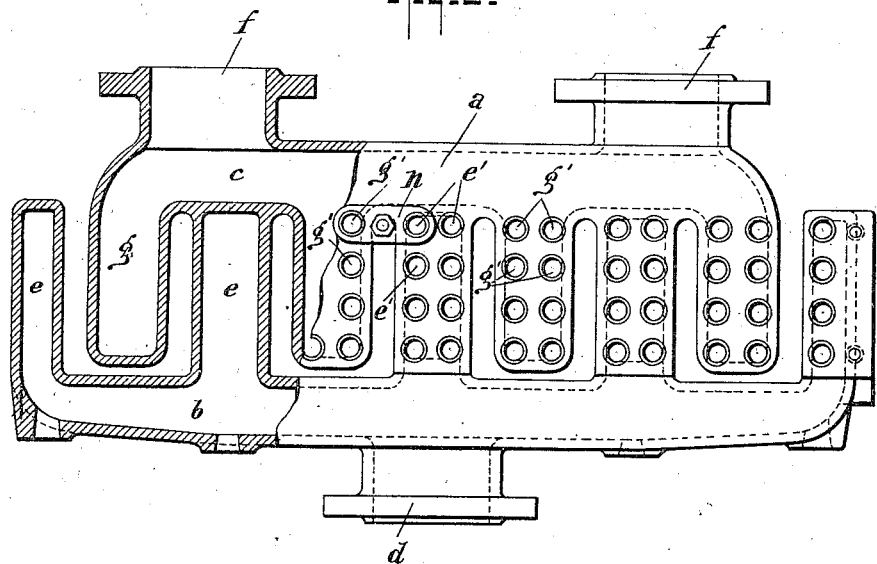

Figure 1 represents a front end elevation of a preferred form of my improved collector; Fig. 2 represents the same in plan view from below, part section, along the line 2—2; Fig. 3 represents a front end elevation of a modified form of my invention; Fig. 4 represents a plan view from below, part section, along the line 4—4 of the form shown in Fig. 3; and Fig. 5 represents a central transverse section along the line 5—5 of Fig. 4.

Referring to the form shown in Figs. 1 and 2 my improved steam collector $a$ is an integral structure which comprises steam headers $b$ and $c$ arranged horizontally one in front of the other. The header $b$ comprises a transverse chamber provided with a central rearwardly extending pipe in the form of a neck $d$ adapted to be attached to the dry pipe of the boiler, from which it receives saturated steam; forwardly extended spaced header branches $e$, of rectangular section, opening from the header $b$ are also provided. Similarly the header $c$ also comprises a transverse chamber provided with two laterally disposed delivery openings $f$ adapted to be attached to a suitable superheated steam pipes which will themselves deliver steam to the steam chests, and header branches $g$, spaced conformably to the branches $e$, which extend toward the transverse chambers of header $b$ and are intermeshed with said branches $e$. The steam collector as a whole is supported by the dry pipe, the superheated steam pipes, and by brackets (not shown) which are attached both to the boiler and to the steam collector.

The collector, when in use, is preferably arranged horizontally in and across the upper part of the smoke box above the boiler flues in a position similar to that occupied by the collector of Cole and Hoffmann, as shown in their above referred to Patent, Number 1,054,676. Superheater units of any usual type are arranged in smoke tubes as usual and the two ends $h$, $h$, of each unit are brought out side by side and bent upwardly so that one end is finally normal to the bottom of the header branch $e$, and in registry with a suitably provided opening $e'$ in the bottom thereof, while the other end is similarly located as to the corresponding opening $g'$ in branch $g$. The unit belonging to the smoke tube immediately above the one just referred to has its ends similarly bent upwardly to the header branches and in registry with the openings $e'$, $g'$ immediately back of the first named openings $e'$, $g'$, and so on for all the units of a given vertical row.

In attaching the ends $h$, $h$, of a superheater unit to the header branches, I preferably arrange each of said ends with a spherical enlargement and countersink each opening $e'$, $g'$ to correspond to said enlargement, thus providing a ball and socket joint. This joint is tightly drawn up by means of a loose connecting clamp $n$ and a connecting bolt $o$, the clamp having enlarged openings near its ends placed to agree with the ends $h$, $h$, so as to fit over said ends, and a central hole for the bolt $o$. The head of the bolt has the shape of an elongated rectangle and rests in a previously provided slot formed in the top of the collector after the bolt has been slipped up between the two header branches $e$ and $g$, while the nut below, which holds the clamp in place, carries a washer which has its upper surface spherical and engaging the correspondingly countersunk bottom surface of the clamp. A spherically countersunk washer is, preferably, placed at each end of the clamp in which is seated the spherically enlarged pipe end $h$. This mode of attaching the pipe ends to the header branches, i. e., the type of clamp and joint described is identical with that shown in the Cole and Hoffmann patent above referred to, and constitute no part of my present invention.

In operation the saturated steam flows into the header $b$ and into the header branches $e$ from whence it goes through all the superheater units in parallel to the superheated steam header branches $g$, thence to the header $c$ and out of the laterally arranged openings $f$ to the superheater steam pipes in the front of the smoke box.

In my improved collector the intermeshed branches $e$ and $g$ are laterally separated from one another so that there can be but little loss of heat from the superheated branch to the saturated branch. In the thus provided space between these branches are fitted the bolts $o$ by means of which the superheater elements are fastened to the branches. In this respect my improved construction does not differ from the one piece construction, Figs. 4 and 5, of the Cole-Hoffmann patent referred to. In my improved form of collector, however, the superheated branch $g$, besides being separated on each side from the saturated branch $e$, is also completely separated at its end from the transverse passage $b$, the lateral space and the end spaces being united so that in reality the branch $g$ constitutes a finger projecting from the transverse passage $c$. As a result of this construction each superheated finger is free to expand or contract independently of the rest of the collector so that no injurious strains are set up.

The form of my invention shown in Figs. 3-5 is very similar to that of Figs. 1-2, just described, except that the superheated steam header $c$, instead of lying in front of the two sets of header branches $e$ and $g$ at the same level with the saturated steam header, is placed over the outer ends of the two sets of header branches with the front surface of the header flush with the ends of the set which constitute the free fingers. Each of the other set of fingers has its forward end bent upwardly so as to open into the bottom of the said superheated header. The spaces between header branches thus become slots into which the bolts which attach the superheater elements may be slipped, one after the other, from the front. The edges of these slots are formed with shoulders $i$ so as to support the rectangular bolt head and engage it against rotation.

It is not essential that the two headers $b$ and $c$ should be located as to one another exactly as shown in the two modifications herein and intermediate or other positions may be chosen within the scope of the claims which follow.

Instead of providing the separating space at the ends of the superheated branches $g$ I may, if I prefer provide them at the ends of the saturated branches $e$. The modification of Figs. 3-5 is arranged in this way. Similarly I may, if I prefer, place my improved steam collector in some other part of the smoke box than that described without departing from the spirit of my invention. Thus it may be placed on either side of the smoke box, or vertically in the smoke box, or in other positions which may be chosen.

The style of bolt, clamp and pipe end connection described, while preferred, is not essential to the invention and other suitable connecting means may be employed.

Having described my invention, I claim:

1. An integral steam collector comprising two transverse chambers for saturated and superheated steam respectively, and a plurality of branches opening from each chamber and alternately intermeshed, members of one set of branches being completely separated from the steam collector except where they open into their transverse chamber while members of the other set of branches are integrally united to the steam collector both when they open into their transverse chamber and at their opposite ends.

2. An integral steam collector comprising two parallel elongated chambers for saturated and superheated steam respectively, and a plurality of branches extending between said chambers and alternately opening therein so as to constitute intermeshed saturated and superheated fingers, the fingers of one set being integrally united to but one chamber while the fingers of the other set are integrally united to both chambers.

3. In a locomotive of the class described, a steam collector in the upper part of the smoke box comprising two transverse chambers, one disposed forwardly of the other, and a plurality of laterally separated branches opening alternately into said chambers so as to constitute intermeshed saturated and superheated fingers, each of the fingers of one set having an end wall common to the chamber of the opposite set while each of the fingers of the other set has an end wall completely separated from the chamber of the other set.

4. An integral steam collector comprising two transverse chambers for saturated and superheated steam respectively, and a plurality of branches opening from each chamber and alternatively intermeshed, chambers and branches being in the same plane and members of one set of branches being completely separated from the steam collector except where they open into their transverse chamber, while members of the other set of branches are integrally united to both transverse chambers.

5. In a locomotive of the class described, a steam collector in the upper part of the smoke box comprising two transverse chambers, one directly in front of the other and in substantially the same plane, and a plurality of laterally separated branches lying between and opening alternatively into said chambers so as to constitute intermeshed saturated and superheated fingers, each of the fingers of one set having an end wall common to the chamber of the opposite set while each of the fingers of the other set has an end wall completely separated from the chamber of the other set.

6. In a locomotive of the class described, a steam collector in the upper part of the smoke box comprising two transverse chambers, one disposed forwardly of the other, a plurality of laterally separated branches opening alternately into said chambers so as to constitute intermeshed saturated and superheated fingers, each of the fingers of one set having an end wall common to the chamber of the opposite set while each of the fingers of the other set has an end wall completely separated from the chamber of the other set, a plurality of superheater units each of which has its ends connected to adjacent header branches, and fastening means for detachably securing the units in place said fastening means passing between the aforesaid laterally separated branches.

7. An integral steam collector comprising two transverse chambers for saturated and superheated steam respectively, and a plurality of branches opening from each chamber and alternately intermeshed, members of one set of branches being completely separated from the steam collector except where they open into their transverse chamber while members of the other set of branches are integrally united to both transverse chambers, one of the transverse chambers being, furthermore, in a plane entirely outside of the plane of the branches so that slots, open at one side of the steam collector, are formed between said branches for the reception of fastening means.

In testimony whereof I have hereunto set my hand in the presence of two subscribing witnesses.

NEAL TRIMBLE McKEE.

Witnesses:
  Max Schiller,
  James K. Scott.